United States Patent
Bonneville et al.

[11] 3,763,549
[45] Oct. 9, 1973

[54] METHOD OF FRICTION WELDING WITH FLOATING WORKPIECE FIXTURE

[75] Inventors: Gerald D. Bonneville, Orchard Lake; Adolf Hetke, Livonia; William N. Free, Dearborn, all of Mich.

[73] Assignee: General Motors Corporation, Detroit, Mich.

[22] Filed: Aug. 24, 1972

[21] Appl. No.: 283,545

Related U.S. Application Data

[62] Division of Ser. No. 93,140, Nov. 27, 1970, Pat. No. 3,702,169.

[52] U.S. Cl. .............................................. 29/470.3
[51] Int. Cl. ............................................ B23k 27/00
[58] Field of Search ...................... 22/470.3; 228/2; 156/73, 480

[56] References Cited
UNITED STATES PATENTS

| | | | |
|---|---|---|---|
| 3,393,851 | 7/1968 | Funk et al. | 228/2 |
| 3,442,431 | 5/1969 | Funk et al. | 228/2 |
| 3,571,906 | 3/1971 | Barth et al. | 228/2 |
| 3,606,968 | 9/1971 | Loyd | 228/2 |

*Primary Examiner*—J. Spencer Overholser
*Assistant Examiner*—Ronald J. Shore
*Attorney*—W. E. Finken et al.

[57] ABSTRACT

This friction welding method employs a floating shroud in the tail stock of the welder that provides radial support of a workpiece having thin or fragile portions. There is limited shroud rotation relative to the tail stock during the welding process so that torsional forces generated during friction welding will not be transmitted from the workpieces through the shroud to the tail stock. This allows the workpieces to be joined without destruction or damage by the friction welding process. The shroud has a plurality of segments facilitating easy removal of the workpieces from the tail stock.

5 Claims, 2 Drawing Figures

3,763,549

METHOD OF FRICTION WELDING WITH FLOATING WORKPIECE FIXTURE

This application is a division of Ser. No. 93,140, filed Nov. 27, 1970, now U.S. Pat. 3,702,169.

This invention relates to friction welding and more particularly to a friction welding method in which there is floating peripheral support of a workpiece being welded to prevent its damage or destruction during welding.

Friction welding has been widely employed for joining many types of workpieces. In many cases the robust nature of the workpieces makes them quite suitable for this process. In some cases, however, one or both of the workpieces being welded together have relatively thin and weak parts which do not readily lend themselves to friction welding. Providing additional support to enable these workpieces to resist the applied loads during welding has met with only limited success; in some cases it has been extremely difficult to obtain proper friction welds and still maintain the integrity of the welded parts. The high radial and torsional loads applied to such fragile parts have often resulted in their severe damage or destruction. For example, the friction welding of a rotor hub to a bladed ring of a power turbine rotor is difficult since the ring is held from rotation and its blades are relatively thin and fragile and generally must be supported at their tips during the friction welding cycle. This peripheral support is particularly necessary when the geometry of the weld interface consists of two mating cones disposed radially inwardly of the blades; when these two parts are forced together during friction welding, a normal force is produced which causes stresses in the ring section of the bladed workpiece. To prevent yielding and distortion of the ring section, fixed shrouds have been secured to the tail stock of the welder which contact the tips of the blades to prevent damage to the ring section. While such shrouds provided improved welds, the thin blades were subjected to high torsional loads because of the construction and clearances of the stationary holding socket of the welder and the workpiece held thereby. These torsional loads sometimes caused blade distortion and damage. Furthermore, the blades often became press fitted within the shroud, making removal of the two welded parts from the tail socket quite difficult.

With this friction welding method such fragile workpieces can be readily welded without damage or destruction since there is no transmittal of tangential forces through the outer portion of a workpiece being restrained.

In this method a free-floating shroud is employed which will support the radial loads produced during a friction welding operation. The shroud is free to rotate while it supports radial loads so that no tangential force is transmitted through the shroud to a stationary retainer. The floating shroud comprises a ring split so that it easily comes apart and releases the welded workpieces after its expansion in the tail stock. The ease of part removal after welding due to the split ring design and the floating shroud which allows the blade ring movement to eliminate the torsional or tangential loading of the turbine blades provide important advancements in friction welding and particularly in the manufacture of a welded turbine rotor composite.

An object, feature and advantage of this invention is to provide a new and improved method of frictionally welding metallic workpieces together in which one portion of a first workpiece is restrained from rotation by workpiece holding means while a second portion of the first workpiece is allowed to turn relative to the workpiece holding means as it is being frictionally welded to a rotating second workpiece.

Another object, feature and advantage of this invention is to provide a new and improved method of frictionally welding workpieces together in which a central portion of a first workpiece is restrained from rotation by workpiece holding means while the outer peripheral portion is permitted to turn a limited amount relative to the workpiece holding means as it is being restrained from radial expansion and as the first workpiece is being frictionally welded to a second workpiece.

These and other features, advantages and objects of this invention will become more apparent from the following detailed description and drawing in which.

Figures 1, 2:
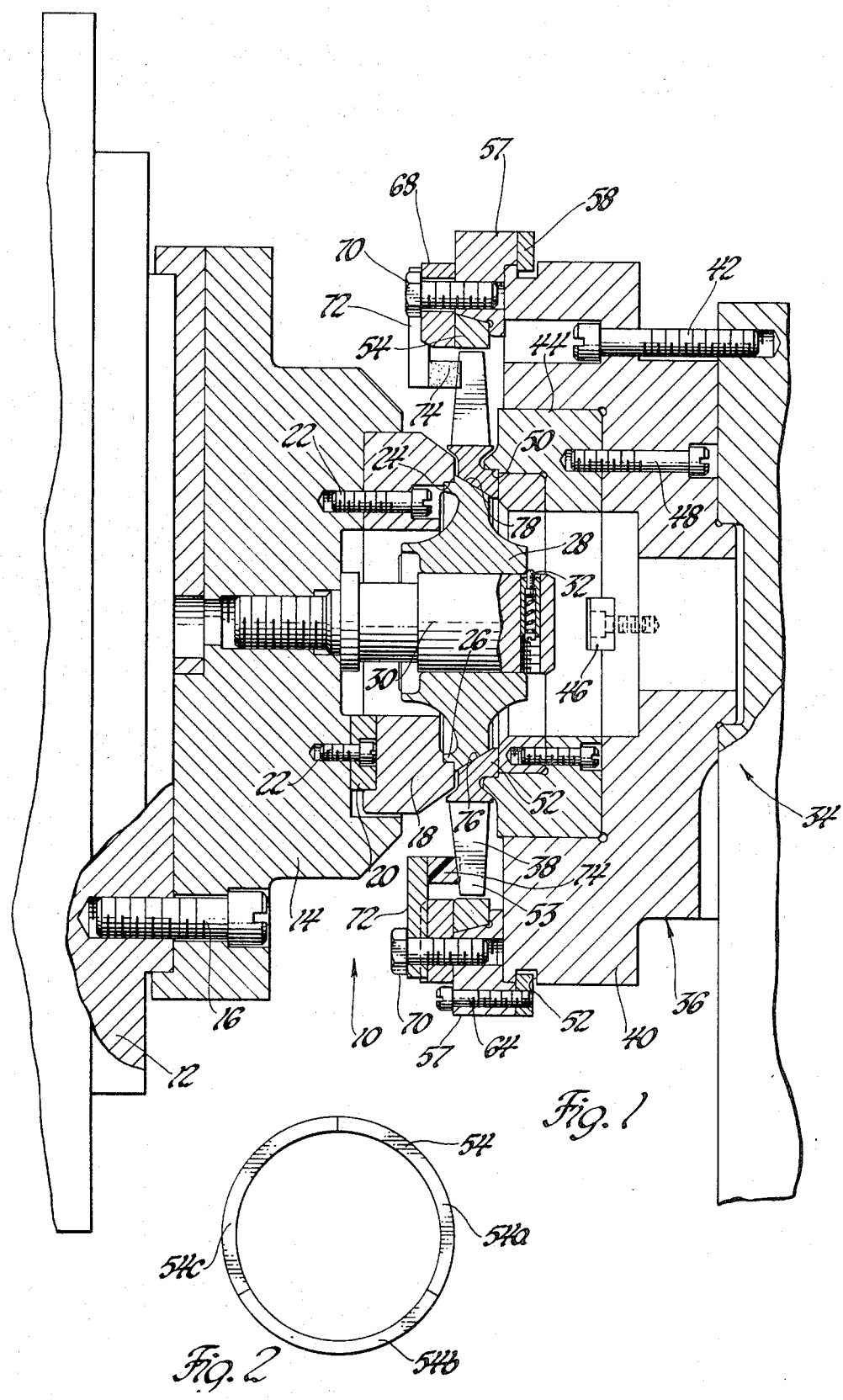
FIG. 1 is a side sectional view of a portion of a friction welder with fixtures holding the workpieces to be welded.
FIG. 2 is a front view of a work-holding ring used with the welder of FIG. 1.

In FIG. 1 a friction welder 10 has a rotatable drive sprindle 12 driven by a suitable motor such as that in U.S. Pat. No. 3,627,189 issued Dec. 14, 1971, for Friction Welder to E. S. Ditto et al. The welder has a head member 14 secured to the end of the spindle by drive keys and by bolts 16. An adapter 18 for holding a first workpiece to be welded is secured to the head member 14 by drive key 20 and by bolts 22.

The adapter has a polygonal drive socket 24 which fits the polygonal-shaped extension 26 of a workpiece 28 which is shown as the hub of a rotor for a gas turbine engine. This hub is formed from a metallic heat-resistant alloy. A central support and pilot member 30 threadedly fastened to the center of the head member 14 projects axially to guide the rotor hub 28 into the drive socket. The pilot member has a radially-disposed, spring operated detent 32 which retains the hub in axial position after being loaded into the drive socket.

The welder 10 has a tail stock 34 which is fixed against rotation but can be moved back and forth on a longitudinal axis for loading, welding and unloading operations by a suitable motor mechanism such as that disclosed in the above-identified patent. The tail stock carries a fixture assembly 36 for holding a second workpiece 38 stationary for friction welding. The fixture assembly has an adapter 40 secured to the tail stock by suitable keys and by bolts 42. Also there is a workpiece holder 44 secured to adapter 40 by key 46 and by bolts 48. Workpiece holder 44 has a polygonal socket 50 which receives the mating polygonal shoulder 52 of a power turbine ring that forms the second workpiece 38 that is to be welded to the first workpiece 28. This workpiece is in this embodiment a power turbine ring of a heat-resistant nickel alloy which has a plurality of evenly-spaced blades 53 extending radially outwardly from the periphery of the central annular section.

The fixture includes a floating annular shroud 54 supported by the tail stock disposed around the tips of the blade to assist in supporting the workpieces during friction welding. This peripheral support is contacted by the tips of the blades 53 during friction welding so that it reduces distortion and possible fracture of the ring portion of workpiece 38. The shroud is preferably made in three separate segments 54a, 54b, and 54c and is supported for floating or limited rotation within a retainer ring 57 which is secured to the adapter 36 by a segmented clamping ring 58 that extends into groove 52 formed in the adapter 36. Bolts 64 threaded through the retainer ring 57 and into the clamping ring 58 may be turned so that the clamping ring rigidly secures the retainer ring to the adapter 40.

An annular clamp member 68 is fixed by bolt 70 to the side face of the retainer ring 57 to confine the floating shroud 54 within the retainer ring 57.

To provide for axial support of the blades 50, a plurality of clamp arms 72 are employed with each being secured to the outer side face of clamp member 68 by bolt 70. As shown, the end of each of these clamp arms has an inwardly-facing block 74 of elastomeric material such as neoprene fixed thereto which contacts some of the blades 53 to provide for the desired axial support.

As shown in the drawing, the geometry of the weld interface is provided by the internal conical face 76 of the power turbine ring and the mating external conical face 78 of the hub 28. When the spindle 12 is driven and the workpieces are forced together in a friction welding process, the high normal force produces a stress in the ring and causes the tips of the blades 53 to contact the shroud 54. Even with this contact and radial support of the blades 38, no tangential forces will be transmitted to the stationary retainer ring 57 by the blades of the power turbine ring in view of the fact that the shroud 54 turns a limited amount during the welding.

After the welding has been completed, the tail stock is retracted with the parts welded together to an unloading position and the clamp arms 72 and clamp member 78 are removed. The welded rotor is then removed. In view of the fact that the ring 54 is split, it easily comes apart to eliminate a press fit with the end of the blades 50.

This invention is not limited to the details of the preferred method shown and described for purposes of illustrating the invention for other modifications will occur to those skilled in the art.

We claim:

1. A method of friction welding separate workpieces together comprising the steps of: securing a first workpiece in a first workpiece holding fixture, securing a second workpiece in a second workpiece holding fixture, mounting a rotatable workpiece contact member in said first workpiece holding fixture radially outwardly from the first workpiece secured therein to limit the radial expansion of said first workpiece during the friction welding of said workpieces together, relatively rotating said workpieces at a predetermined speed, bringing said workpieces into contact with each other at a common interface as they are being relatively rotated so that said interface is heated by the frictional rubbing of said workpieces, exerting a force on said workpieces during welding resulting in a pressure at said interface to cause said first workpiece to expand into a terminal radial position determined by the engagement of said first workpiece with said rotatable contact member and turning said contact member relative to said first workpiece holding fixture by a torsional force transmittted to said contact member through said first workpiece as said workpieces are being frictionally welded together at said common interface.

2. A method of friction welding separate workpieces together comprising the steps of: providing a first workpiece with a recess having a peripheral wall providing a curved contact surface disposed inwardly with respect to the outer extremities of said first workpiece, providing a second workpiece with a curved contact surface which is adapted to engage the curved contact surface of said first workpiece, securing said first workpiece in a first workpiece holding fixture, securing a second workpiece in a second workpiece holding fixture, mounting a rotatable contact member in said first workpiece holding fixture radially outwardly with respect to the outer extremities of said first workpiece to limit the radial expansion thereof, relatively rotating said workpieces, relatively moving said workpieces until said curved contact surfaces are engaged at a common interface and so that said interface is heated by the frictional rubbing of said workpieces, exerting a force on said workpieces as they are being frictionally welded together at said interface to cause said outer extremity of said first workpiece to engage and turn said rotatable contact member.

3. A method of friction welding a first workpiece having a plurality of outwardly projecting blades to a second workpiece comprising the steps of: providing a central recess in said first workpiece having a conical wall located radially inwardly from said blades, providing said second workpiece with a projecting conical surface which is adapted to mate with the conical wall of said first workpiece, securing said first workpiece in a workpiece holding fixture, securing said second workpiece in a second workpiece holding fixture, mounting a rotatable contact member in said first workpiece holding fixture radially outwardly from the tips of said blades to limit the radial expansion of said first workpiece, relatively rotating said workpieces, relatively moving said relatively rotating workpieces axially until said conical wall and said conical surface engage at a common interface, exerting a force on said workpieces as they are being relatively rotated so that said interface plasticizes, continuing said force to radially expand said first workpiece to cause the tips of said blades to engage said rotatable contact member and turn said rotatable contact member within said first workpiece holding fixture thereby allowing said workpieces to be frictionally welded together at said interface without damage to said blades as the relative rotation of said workpieces stops, and removing said welded workpieces from said workpiece holding fixtures.

4. A method of friction welding a first workpiece having a plurality of outwardly projecting blades to a second workpiece comprising the steps of: providing a recess in said first workpiece having a conical wall in the center thereof located radially inwardly from said blades, providing said second workpiece with a projecting conical surface which is adapted to mate with the conical wall of said first workpiece, securing said first workpiece in a workpiece holding fixture, securing said second workpiece in a second workpiece holding fixture, mounting a segmented and annular contact member for turning movement in said first workpiece holding fixture radially outwardly from the tips of said blades to limit the radial expansion of said first workpiece, relatively rotating said workpieces, relatively moving said workpieces along a longitudinal axis until said conical wall and said conical surface engage at a common interface, exerting an engaging force on said workpieces as they are being relatively rotated so that said interface will frictionally heat and plasticize, continuing said force to thereby exert a radial force on said blades causing the tips of said blades to engage said rotatable contact member and turn said rotatable contact member within said first workpiece holding fixture thereby allowing said workpieces to be frictionally welded together at said interface without damage to said blades, stopping the relative rotation of said workpieces and removing said welded workpieces from said workpiece holding fixture and from said contact member.

5. A method of frictionally welding a first metal workpiece having a peripheral portion subject to torsional loading during welding to a second metal workpiece comprising the steps of: loading said first workpiece in a rotatable first workpiece holding fixture, loading said second workpiece in a second workpiece holding fixture, installing a rotatable support for siad first workpiece in said first workpiece holding fixture radially spaced from said peripheral portion of said first workpiece, securing said first workpiece holding fixture against rotation, rotating said second workpiece holding fixture and the second workpiece held thereby relative to said first workpiece holding fixture and said first workpiece held thereby, engaging said workpieces under predetermined load at a common interface while said workpieces are being relatively rotated, continuing said loading and relative rotation of said workpieces to expand said first metal workpiece radially until said peripheral portion contacts and torsionally turns said rotatable support relative to said first workpiece holding fixture, stopping the relative rotation of said workpieces as said workpieces become welded together, and removing said welded workpieces from said first and second workpiece holding fixtures and from said rotatable support.

* * * * *

UNITED STATES PATENT OFFICE
CERTIFICATE OF CORRECTION

Patent No. 3,763,549      Dated October 9, 1973

Inventor(s) Gerald D. Bonneville et al

It is certified that error appears in the above-identified patent and that said Letters Patent are hereby corrected as shown below:

Column 1, line 45, "socket" should be -- stock --; lines 60 and 61, delete "and the floating shroud which allows the blade ring movement to eliminate" and insert therefor -- in addition to the elimination of --. Column 2, line 62, "blade" should be -- blades --. Column 3, line 1, after "a" insert -- stationary --; line 11, "50" should be -- 53 --; line 14, "bolt" should be -- bolts --; line 24, before "ring" insert -- power turbine --; line 26, "38" should be -- 53 --; line 35, delete "ring" and insert therefor -- shroud --; line 37, "50" should be -- 53 --. Column 5, line 20, "siad" should be -- said --.

Signed and sealed this 20th day of August 1974.

(SEAL)
Attest:

McCOY M. GIBSON, JR.
Attesting Officer

C. MARSHALL DANN
Commissioner of Patents